United States Patent

Nard

[15] 3,696,427
[45] Oct. 3, 1972

[54] RADIO-NAVIGATION SYSTEM

[72] Inventor: Georges Pierre Nard, Nantes, France

[73] Assignee: Compagnie Generale de Geophysique, Paris, France

[22] Filed: June 2, 1970

[21] Appl. No.: 42,810

[30] Foreign Application Priority Data

June 4, 1969 France...................6918336

[52] U.S. Cl. .........................343/112 D, 343/112 R
[51] Int. Cl. ..............................................G01s 5/14
[58] Field of Search................................343/112 D

[56] References Cited

UNITED STATES PATENTS

| | | | |
|---|---|---|---|
| 3,339,202 | 8/1967 | Earp | 343/112 D X |
| 2,248,727 | 7/1941 | Strobel | 343/112 |
| 3,150,372 | 9/1964 | Groth, Jr. | 343/112 D UX |

*Primary Examiner*—Benjamin A. Borchelt
*Assistant Examiner*—Richard E. Berger
*Attorney*—Oberlin, Maky, Donnelly & Renner

[57] ABSTRACT

The invention concerns an improved radio-navigation system for determining the position of a moving body relative to at least two remote transmitters.

In this radio-navigation system there are produced in the body carried receiver two local LF signals of frequency $f_1$ and $f_2$, and the phase differences are determined in phasemeters between each of the local signals and radio-navigation LF signals of the same frequencies, the phases of which are a function of the distances between the transmitters and the moving body. The radio-navigation LF signals are obtained from two radio-navigation HF signals received by the body from the transmitters, the frequencies of which are equal to $F + f_1$ and $F + f_2$, the signals of frequencies $f_1$ and $f_2$ being extracted by successive mixings with signals of frequencies $F - F_i$ and $F_i$.

5 Claims, 3 Drawing Figures

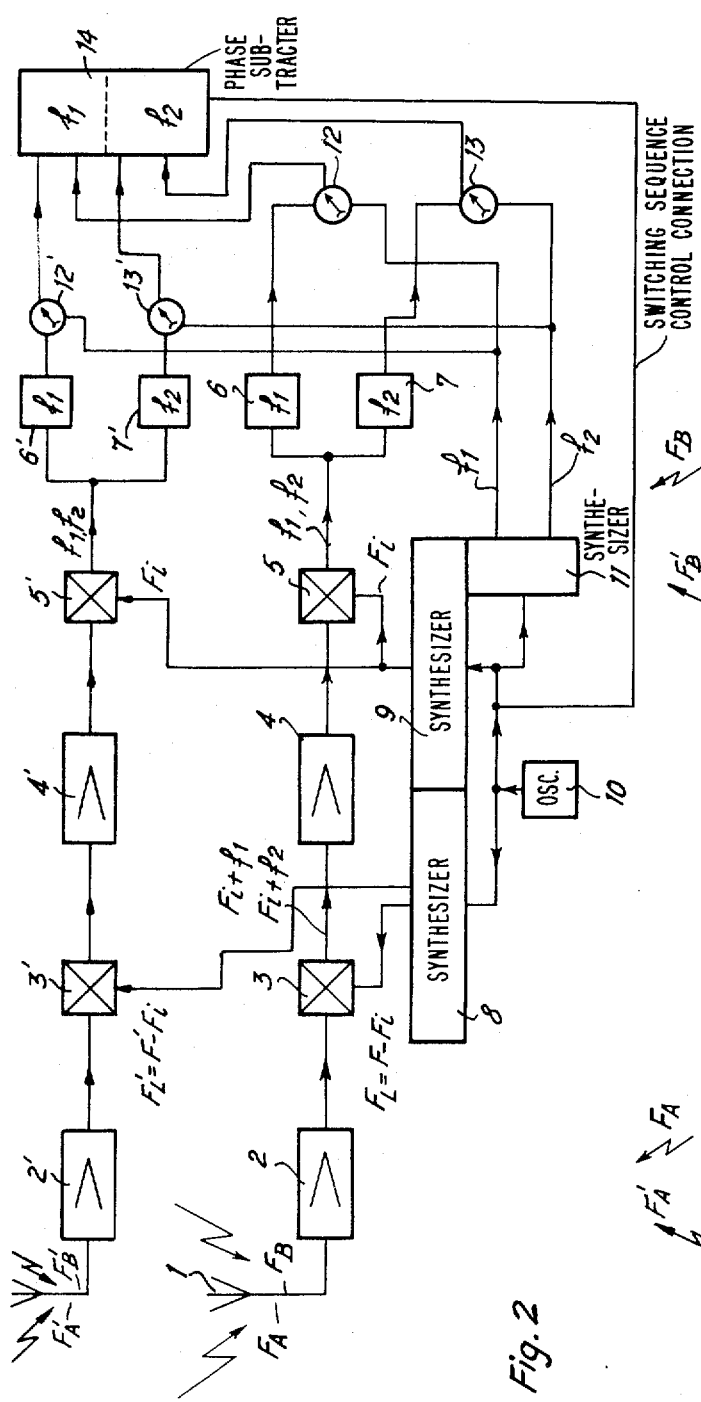
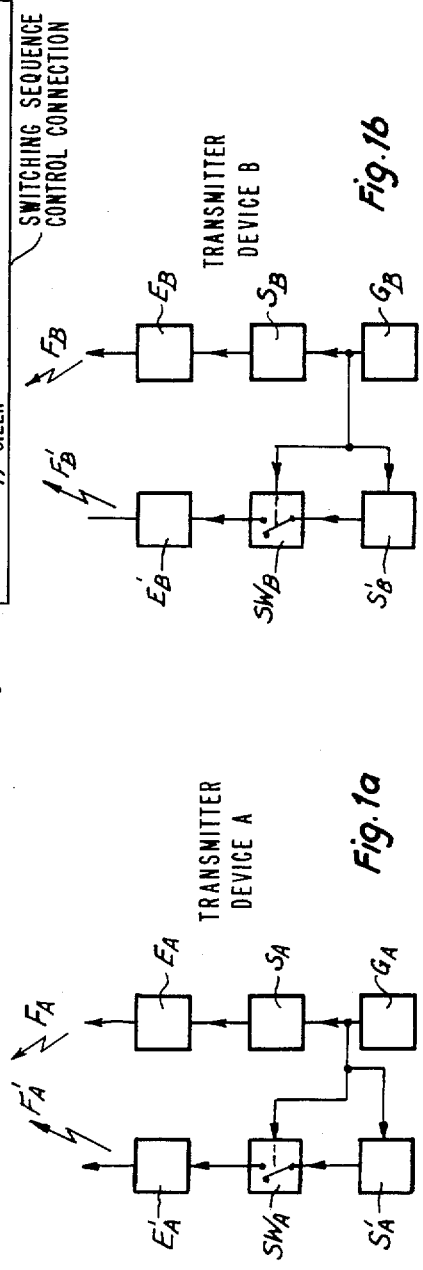

RADIO-NAVIGATION SYSTEM

The present invention concerns an improved radio-navigation system.

In known radio-navigation systems, high-frequency radio-navigation signals are transmitted from fixed transmitters and are intended to be picked up in a receiver on board a moving body for processing to provide information on the position of the moving body relative to the transmitters. This information is contained in the phase difference between low-frequency signals modulated on to the HF signals, this phase difference resulting from the difference in the distances between the distinct transmitters and the moving body. Such radio-navigation systems are currently in use and comprise synchronized or controlled transmitters ("DECCA," "RANA" systems) or are constructed in accordance with French Patent Specification 790 386 ("LORAC," "RAYDIST," "TORAN").

These radio-navigation systems have disadvantages arising more particularly out of the complexity of the groups of transmitted signals.

According to the present invention, for eliminating these disadvantages, there are produced in the receiver itself at least two local LF signals, and the phase of each of these two local LF signals is compared respectively with the phase of two radio-navigation signals of the same low frequency, the two radio-navigation LF signals being obtained from two high-frequency radio signals $F_A$ and $F_B$ transmitted from two distinct transmitters by mixing with a basic signal of frequency $F$, the values of these high frequencies being such that they differ from the said basic high frequency F by a low frequency $f_1$ and $f_2$, respectively, equal to that of the local LF signals ($F_A = F + f_1$; $F_B = F + f_2$); since the phase of each of the radio navigation LF signals is proportionately affected by the distance between the corresponding transmitter and the moving body, the said phase comparisons provide information on the position of the moving body relative to each of the transmitters.

The receiver according to the invention for treating the radio-navigation HF signals comprises means for producing the two local LF signals, and means for treating the radio-navigation HF signals by heterodyning to obtain the two LF radio-navigation signals.

For a better understanding of the manner in which the present invention may be carried out, a description will be given, by way of example of a preferred radio-navigation system with reference to the accompanying drawings, in which:

FIGS. 1a and 1b represent two transmitting devices, and

FIG. 2 represents a receiver.

Two radio-navigation HF signals $F_A$ and $F_B$ are transmitted from two distinct transmitters $E_A$ and $E_B$, these frequencies being such that $$F_A = F + f_1$$

and $$F_B = F + f_2$$

where $F$ is a high frequency of a value of 2 Mc/s for example, and $f_1$, $f_2$ are two frequencies low compared with $F$, being for example respectively 80 and 200 Hz ($f_1 = 80$ Hz; $f_2 = 200$ Hz). The values of $f_1$ and $f_2$ are selected to be low enough for compatibility of the frequency band occupied by the transmission with a single frequency allocation in the administrative sense. Each of the two transmitters $E_A$, $E_B$ is piloted by a very stable oscillator $G_A$, $G_B$ associated with a frequency synthesizer $S_A$, $S_B$. Rubidium or caesium vapor type oscillators are used, having stabilities of the order of $10^{-11}$. A frequency synthesizer is formed, for example, by a counter-divider delivering at separate outputs indicated signals of different frequencies, which are combined to produce the desired frequency.

Due to the high stability of the oscillators, the phase of the HF signals transmitted is practically constant on transmission and varies only as a function of the distance of the transmitter.

These signals are picked up on board a moving body, whose position it is desired to determine relative to the transmitters A and B, and they are processed there for this purpose in a receiver, such as that shown in FIG. 2. The transmitted HF signals are picked up by an aerial 1 and amplified in an amplifier 2, the pass-band of which is sufficient for distortion-free amplification and filtration of the two signals of frequencies $F_A$ and $F_B$. The receiver comprises a first mixer 3, to which are applied simultaneously the signals of frequencies $F_A$ and $F_B$ and a signal of heterodyning frequency $F_L = F - F_i$, where $F_i$ is an intermediate frequency between the frequencies $F$ and $f_1$, $f_2$. At the output of the mixer 3, there is therefore obtained two radio-navigation signals of intermediate frequencies $F_i + f_1$ and $F_i + f_2$ in accordance with the conventional technique of wireless receivers of superheterodyne type. The signals of intermediate frequencies are amplified in an amplifier 4 having a pass-band just wide enough to amplify, without any appreciable distortion, the signals from the first mixer 3.

The signals thus amplified are mixed in a second mixer 5 with a signal of intermediate frequency $F_i$ for supplying two LF radio-navigation signals having the respective frequencies $f_1$, $f_2$. These two LF signals are separated into two channels by the filters 6, 7. The mixer 5 is of the single side-band type. The filters 6 and 7 have a band just sufficient to absorb any possible Doppler effect (in the case of fast moving bodies). The unit 5, 6 and 7 forms a coherent system which renders the filtering obtained equivalent to that which would be obtained directly on the carrier wave.

The signals of frequencies $F_L$ and $F_i$ are supplied by synthesizers 8 and 9 fed by a high-stability oscillator 10. The oscillator 10 also supplies another synthesizer 11 which delivers two local signals of the low frequencies $f_1$ and $f_2$.

A phasemeter 12 compares the phases of the local signal and the radio-navigation signal of the same frequency $f_1$ and indicates the phase difference $\epsilon_A$ between them. A phase meter 13 also indicates the phase difference $\epsilon_B$ between the local signal and the radio-navigation signal of the same low frequency $f_2$.

From what has been said in the foregoing, we have $$\epsilon_A = 2\pi/V \cdot F_A \cdot AM \text{ in radians}$$

and $$\epsilon_B = 2\pi/V \cdot F_B \cdot BM \text{ in radians, where V is the speed of propagation of the waves,}$$

AM is the distance between the transmitter A and the moving body M,

BM is the distance between the transmitter B and the moving body M.

In other words, the phase difference is proportional to the distance between the moving body and the transmitter considered. The knowledge of the distances AM and BM then supplies the position of the moving body M relative to the fixed transmitters A and B.

There is, however, some ambiguity with regard to the measurement of distances, as in any device using phase measurements. The equiphase loci are here circles having their centers at each of fixed points, and determine between them circular "channels." The width of a channel corresponding to a 360° change of phase is here about 150 m. The measurement of the phase places the moving body precisely inside a channel, without knowing which channel it is.

It is possible to take extra steps for improving the cover of a given zone or for increasing the redundancy of the system. For example, for making a third measurement of distance from a fixed point C, not shown, there is transmitted from this point a third radio-navigation signal of a frequency $F_C$, such that $F_C = F + f_3$ where $f_3$ is a low frequency distinct from $f_1$ and $f_2$. The receiver comprises, in addition to the two filters 6, 7, a third filter tuned to the low frequency $f_3$. The synthesizer 11 then supplies a third local signal of frequency $f_C$, the phase of which is compared with that of the radio-navigation signal of frequency $f_3$ in a third phasemeter indicating the phase difference $$\epsilon_C = 2\pi/V \cdot F_C \cdot CM \text{ in radians.}$$

By means of this radio-navigation system, it is possible to ascertain the distance from one point to one or more other points. The number of moving bodies M using the system is unlimited. It will be noted that the moving body M is equipped only with a receiver, to the exclusion of any transmitter.

The band width, equal at the most to the difference between the lowest and highest of the low frequencies $f_1, f_3, f_3$ of the local signals is very narrow. The result is that the high frequencies transmitted occupy only a narrow band in the radio spectrum, so that the radio-navigation method only requires one frequency in the administrative sense.

The use of very stable frequency sources permits very narrow band filtering of the received signals. The pass-band is limited only by the Doppler effect in the case of fast moving bodies, and by the switching characteristics of the signals in the case of a channel identification sequence transmission device, such as will be considered later. The use of coherent demodulation means that filtering carried out at low frequency is equivalent to filtering effected on the carrier wave.

To eliminate ambiguity between the above-mentioned channels, there are transmitted simultaneously in addition to the signals of frequencies $F_A$ and $F_B$, signals of frequencies $F'_A$ and $F'_B$ from the transmitters A and B, respectively, such that:

$$F'_A = F' + f_1 \text{ for the transmitter A}$$

$$F'_B = F' + f_2 \text{ for the transmitter B,}$$

with $$F' = F + \Delta F_1$$

The signals $F'_A$ and $F'_B$ are used like the signal $F_A$ and $F_B$ in corresponding receiver components distinguished by primed numerals for obtaining the radio-navigation LF signals $f_1$ and $f_2$, and the phase of the latter is compared with the local signals, such that we have:

$$\epsilon'_A = 2\pi/V \cdot F'_A \cdot AM$$

$$\epsilon'_B = 2\pi/V \cdot F'_B \cdot BM.$$

The phase differences $\epsilon_A$, $\epsilon_B$ are then subtracted in phase subtracter 14 from the differences $\epsilon'_A$, $\epsilon'_B$, such that we have:

$$\epsilon'_A - \epsilon_A = 2\pi/V \cdot F_1 \cdot AM$$

$$\epsilon'_B - \epsilon_B = 2\pi/V \cdot F_1 \cdot BM.$$

New channels are thus obtained, about $F/\Delta F_1$ times larger than the previous channels, $\Delta F_1$ being much smaller than $F$.

The transmission $F'_A$ and $F'_B$ may be made intermittently according as by way of interposed switching devices $SW_A$ and $SW_B$ to a predetermined sequence.

It is also possible to transmit, in the course of another part of the sequence and still in addition to the frequencies $F_A$ and $F_B$, another group of two frequencies $F''_A$ and $F''_B$, not shown, such that:

$$F''_A = F + \Delta F_2 + f_1, \text{ for the transmitter A}$$

$$F''_B = F + \Delta F_2 + f_2, \text{ for the transmitter B.}$$

By a judicious choice of $\Delta F_2$, it is possible to obtain still wider fictitious channels than those produced by means of $\Delta F_1$, for reducing the ambiguity to a value such that the moving body may be located completely in the network.

At reception, it is possible to use for $\Delta F_2$ the same circuits as those used for $\Delta F_1$ by simple switching means. The results of the phase measurements corresponding to $\Delta F_2$ may be stored for permanent use or reading.

Only one frequency is used from the administrative point of view for producing the basic network (formed of channels corresponding to the frequencies $F_A$ and $F_B$) having two or more circular loci. Furthermore, only one additional frequency is used per degree of ambiguity removal.

The switching speed of the ambiguity removal frequencies is selected as a function of the speed of the moving bodies (marine or aircraft).

The moving receiver is equipped with phase-measuring systems eliminating the switching frequency and ensuring integration of the movement between the successive measurements of the ambiguity removal phases.

Preferably, the switching cycle of the ambiguity removal frequencies as shown in the drawing is controlled by the stable oscillators with which the transmitting and receiving stations are equipped, whereby excellent synchronization of the cycle may be obtained.

The precision obtained in determining a distance depends on two essential factors: the sensitivity of the position measurement and the stability of the oscillators used.

a. The sensitivity depends on the width of the circular channels produced, and therefore on the frequency used and the precision and stability of the phase measurement.

Under normal conditions, it is considered that the reading precision is one-hundredth of a channel. At a frequency of 2Mc/s, the sensitivity is therefore $$1/100 \ V/F \text{ or } 1.5 \text{ meters.}$$

b. The stability of the oscillators used as pilots in the transmitters and as heterodyne frequency oscillator in the receiver should be very high. For example, a rubidium vapor "clock" has a drift of the order of $10^{-11}$. This corresponds to an error in the distance measured of $$3.10^8 \text{ m/sec} \times 10^{-11} = 3.10^{-3} \text{ meter/second, i.e. } 10.8$$
$$\text{meters per hour.}$$

This precision is sufficient for many applications. It may furthermore be improved by "pairing" of the oscillators and by using methods of determining the systematic oscillator drifts.

The phase measuring devices used permit digitalizing of the position data, and analogue or digital processing of the distance measurements in certain peripheral navigation devices, such as route tracers, co-ordinate converters, computers, etc.

What is claimed is:

1. In a radio-navigation system in which high frequency radio signals are transmitted from transmitters to a receiver on board a remotely located moving body for processing to obtain information on the position of the moving body relative to the transmitters, the improvement consisting in means for transmitting from at least two distinct transmitters high frequency radio-navigation signals ($F_A$, $F_B$) the frequency difference between which is a low frequency ($F_A = F + F_1$ and $F_B = F + F_2$), receiver means for receiving and heterodyning said high frequency radio-navigation signals in the receiver to obtain low frequency radio-navigation signals ($f_1, f_2$) the phases of which represent the phases of the respective high frequency radio-navigation signals as received, means for producing locally in said receiver means independently of said high frequency radio-navigation signals at least two different low frequency local signals having the same frequencies ($f_1$ and $f_2$) as the low frequency radio-navigation signals respectively, and means for comparing the phase of each of the local signals with the respective low frequency radio-navigation signal whereby the phase difference between each respective pair of $f_1$ and $f_2$ frequencies supplies information on the position of the moving body relative to each of the at least two transmitters.

2. A radio-navigation system according to claim 1 characterized in that in addition to the two radio-navigation HF signals, there are transmitted at least one group of two ambiguity removal HF signals $F'_A$ and $F'_B$ from the two distinct transmitters, the values of the frequencies of the ambiguity removing signals being such that they differ from a same basic high frequency $F''$ by the low frequency $f_1$ and $f_2$, respectively ($F'_A = F' + f_1$; $F'_B = F' + f_2$), the difference between the basic frequencies $F$ and $F'$ being small compared with $F$, means producing two ambiguity removal LF signals of frequencies $f_1$ and $f_2$ from the ambiguity removal HF signals, and means for comparing the phase difference between the local produced LF signals and the ambiguity removal LF signals, whereby the difference obtained between the last said phase difference and the difference obtained between the radio-navigation LF signals and the local LF signals provides wider channels, thus permitting the ambiguity removal.

3. A radio-navigation system according to claim 2 characterized in that the transmission of the two ambiguity removal HF signals is sequential.

4. A system according to claim 1 characterized in that the receiver means for obtaining the two radio-navigation LF signals from the radio-navigation HF signals comprises a first mixer for mixing the at least two radio-navigation HF signals with a heterodyning frequency $F - F_i$ to produce two intermediate radio-navigation signals $F_i + f_1$ and $F_i + f_2$, and a second mixer having only one side band for mixing the two intermediate radio-navigation signals with an intermediate frequency signal $F_i$ for obtaining the two radio-navigation LF signals.

5. A system according to claim 4 characterized in that the receiver means comprises an oscillator generating a periodic electric signal and a frequency synthesizer fed by the oscillator, the signals of frequencies $F - F_i$, $F_i$ and the local LF signals being supplied by the synthesizer.

* * * * *